(12) United States Patent
Takeda et al.

(10) Patent No.: US 11,683,196 B2
(45) Date of Patent: Jun. 20, 2023

(54) COMMUNICATION CONTROL DEVICE AND NON-TRANSITORY COMPUTER READABLE MEDIUM

(71) Applicant: FUJIFILM BUSINESS INNOVATION CORP., Tokyo (JP)

(72) Inventors: Koji Takeda, Kanagawa (JP); Ayumi Kobayashi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 143 days.

(21) Appl. No.: 17/074,757

(22) Filed: Oct. 20, 2020

(65) Prior Publication Data
US 2021/0377066 A1 Dec. 2, 2021

(30) Foreign Application Priority Data

May 27, 2020 (JP) .............................. JP2020-092552

(51) Int. Cl.
*H04L 12/28* (2006.01)
*H04L 12/46* (2006.01)
*H04L 12/66* (2006.01)

(52) U.S. Cl.
CPC ...... *H04L 12/2854* (2013.01); *H04L 12/4633* (2013.01); *H04L 12/4641* (2013.01); *H04L 12/66* (2013.01)

(58) Field of Classification Search
CPC ............. H04L 12/2854; H04L 12/4633; H04L 12/4641; H04L 12/66
See application file for complete search history.

(56) References Cited

U.S. PATENT DOCUMENTS

| 9,521,117 | B2* | 12/2016 | Barton | H04L 63/0807 |
| 10,367,648 | B2* | 7/2019 | Zhou | H04L 12/4641 |
| 2011/0289568 | A1* | 11/2011 | Uchiyama | H04L 67/125 726/6 |
| 2012/0002815 | A1* | 1/2012 | Wei | H04L 63/0272 380/270 |

(Continued)

FOREIGN PATENT DOCUMENTS

| CN | 107948041 A | * | 4/2018 | ......... H04L 12/4633 |
| JP | 2019-030015 A | | 2/2019 | |

*Primary Examiner* — Khaled M Kassim
*Assistant Examiner* — Kai Chang
(74) *Attorney, Agent, or Firm* — Oliff PLC (57) ABSTRACT

A communication control device includes: a processor configured to: acquire identification information of a communication terminal from the communication terminal that is authenticated by communication via a wide area communication network; and when the identification information is included in a storage storing an information set in which associated are (i) the identification information of the communication terminal and (ii) specific connection unit information indicating a specific connection unit that is predetermined for the communication terminal in a narrow area communication network different from the wide area communication network, perform control such that the communication terminal is connected to the specific connection unit as a connection destination of the communication terminal, based on the specific connection unit information of the information set including the acquired identification information.

20 Claims, 6 Drawing Sheets

(56) References Cited

U.S. PATENT DOCUMENTS

| | | | |
|---|---|---|---|
| 2015/0379150 A1* | 12/2015 | Duda | H04L 45/586 |
| | | | 707/736 |
| 2016/0080212 A1* | 3/2016 | Ramachandran | H04L 43/0817 |
| | | | 370/338 |
| 2016/0080251 A1* | 3/2016 | Ramachandran | H04L 47/24 |
| | | | 370/389 |
| 2016/0149764 A1* | 5/2016 | Brandwine | H04L 41/12 |
| | | | 709/223 |
| 2017/0339631 A1* | 11/2017 | Pugaczewski | H04W 12/06 |
| 2018/0255591 A1* | 9/2018 | Valicherla | H04L 12/4641 |
| 2018/0295067 A1* | 10/2018 | Xia | H04L 41/5003 |
| 2019/0007236 A1 | 1/2019 | Ishii et al. | |
| 2019/0253275 A1 | 8/2019 | Ishii et al. | |
| 2021/0250203 A1* | 8/2021 | Fukuda | H04L 41/12 |

\* cited by examiner

COMMUNICATION CONTROL DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-092552 filed May 27, 2020.

BACKGROUND

1. Technical Field

The present disclosure relates to a communication control device and a non-transitory computer readable medium.

2. Related Art

When electronic devices are connected via a wide area communication network (for example, wide area network (WAN)) such as the Internet, it is necessary to establish secure connection between both electronic devices. For example, a technique is known which is capable of providing secure communication between a terminal and a data center when the terminal is connected to the data center via a wireless local area network (LAN) and a wide area communication network (see, for example, JP-A-2019-030015). In a communication system in which a virtual core network is provided in a data center of a cloud business operator, this technique provides a secure communication connection (voice call or data communication) between the data center and a terminal for an access from a non-3rd generation partnership project (non-3GPP) access network. The non-3GPP access network is an internet protocol (IP) access network using an access technology having a specification outside the scope of the 3GPP.

SUMMARY

By the way, a mobile terminal such as a smartphone is freely used in any place as long as communication is possible. However, it is difficult to protect the mobile terminal from an attack from a WAN following a security policy and to manage an occurrence status of an incident. Therefore, there is room for improvement in managing a terminal that is used freely in a place where the communication is possible.

Aspects of non-limiting embodiments of the present disclosure relate to a communication control device and a non-transitory computer readable medium capable of (i) protecting a terminal connectable to a wide area communication network from an attack from a WAN following a security policy and (ii) managing an occurrence status of an incident, as compared with a case where a terminal connectable to the wide area communication network is freely connected to the wide area communication network for use.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a communication control device including: a processor configured to: acquire identification information of a communication terminal from the communication terminal that is authenticated by communication via a wide area communication network; and when the identification information is included in a storage storing an information set in which associated are (i) the identification information of the communication terminal and (ii) specific connection unit information indicating a specific connection unit that is predetermined for the communication terminal in a narrow area communication network different from the wide area communication network, perform control such that the communication terminal is connected to the specific connection unit as a connection destination of the communication terminal, based on the specific connection unit information of the information set including the acquired identification information.

BRIEF DESCRIPTION OF THE DRAWINGS

Exemplary embodiment(s) of the present disclosure will be described in detail based on the following figures, wherein.

DETAILED DESCRIPTION

Hereinafter, exemplary embodiments of the present disclosure will be described in detail with reference to the accompanying drawings. Elements and processes implementing the same operations, actions, and functions may be given the same reference numerals throughout the drawings, and redundant description may be appropriately omitted. The drawings are merely schematic representations such that the technique of the present disclosure can be fully understood. Therefore, the technique of the present disclosure is not limited only to illustrated examples. In the exemplary embodiments, description of a configuration that is not directly related to the present disclosure or a known configuration may be omitted.

In the present disclosure, the term "device" is a concept covering an electronic devices including a computer. For example, the device may be a server or a personal computer. In addition, the device may be an electronic device including an image forming device having an image processing function and a communication function. The image processing function is a concept covering an image forming function that includes an image copying function of copying an original document, an image printing function of printing data of an input original document, and an image reading function of reading (scanning) the original document as an image to convert the image into data. The communication function is a concept including a wired communication function of transmitting and receiving data by a wired connection with an external device or a direct connection with the external device, and a wireless communication function of transmitting and receiving data by a wireless connection with an external device.

In the present disclosure, the term "communication terminal" is a concept covering a terminal having the wired communication function or the wireless communication function.

Mobile terminals such as smartphones have been connectable to electronic devices via a wide area communication network (for example, WAN) such as the Internet. The mobile terminals such as the smartphones are freely used in any place as long as communication is possible. However, it is difficult to protect the mobile terminals from an attack from the WAN following a security policy and to manage an occurrence status of an incident. Therefore, in the exemplary embodiments, based on identification information of an own device and authentication information, the identification information and the authentication information are received via the wide area communication network from a communication terminal that communicates with a connection destination through the wide area communication network. Then, authentication is performed based on the received identification information and authentication information, and when the authentication is successful, the communication terminal is connected to a narrow area communication network. Accordingly, a terminal that is connectable to the wide area communication network can be managed.

First Exemplary Embodiment

Figure 1:
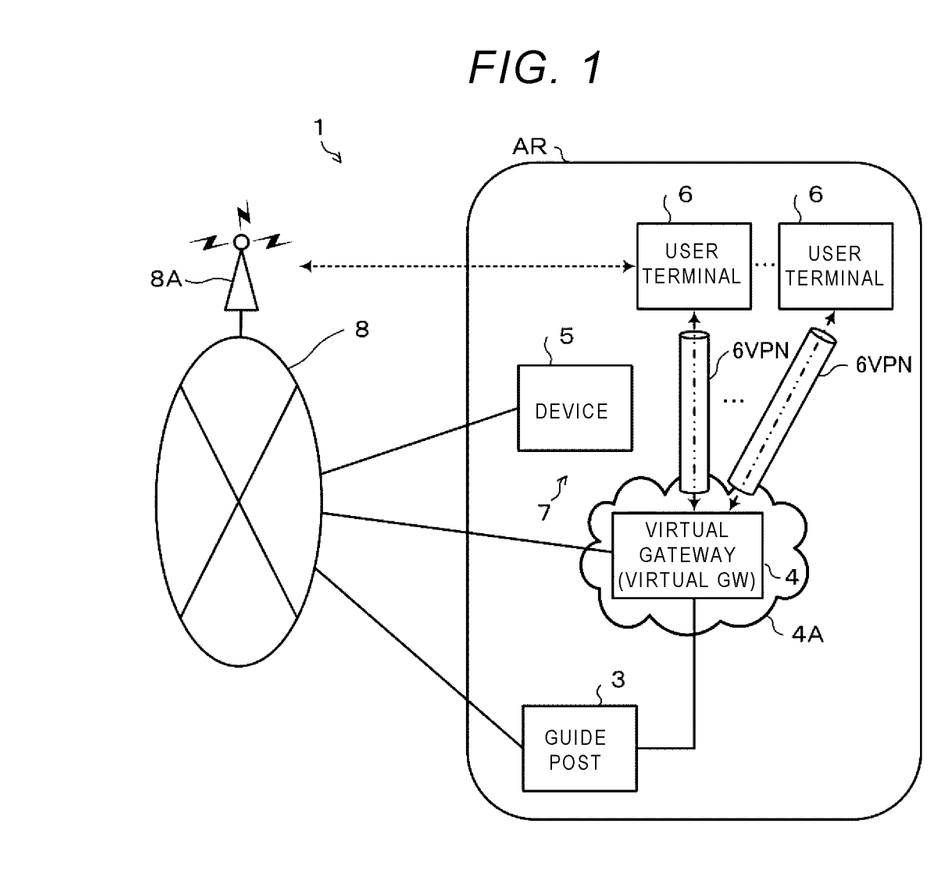
FIG. 1 is a diagram illustrating a schematic configuration of a network system according to an exemplary embodiment.

FIG. 1 is a diagram illustrating a schematic configuration of a network system according to an exemplary embodiment of the present disclosure.

As shown in FIG. 1, a network system 1 includes an internal network 7 serving as a narrow area communication network and an external network 8 serving as a wide area communication network. The internal network 7 enables data exchange in a management target area AR, for example, a base of a company. An example of the external network 8 is the Internet. An access point 8A for exchanging data with the external network 8 through wireless communication is connected to the external network 8. The internal network 7 is an example of a network that enables management of a terminal in the management target area AR.

The management target area AR includes a guide post 3, a virtual gateway (GW) 4, and a device 5 such as a computer, each of which is connectable to the external network. The guide post 3 and the virtual gateway (GW) 4 are connected such that information can be exchanged therebetween.

The virtual gateway 4 can be constructed on a so-called cloud 4A. That is, the virtual gateway 4 may use, as a virtual computer resource similar to a server constructed in the management target area AR, a server constructed on a network such as the Internet using cloud computing.

FIG. 1 shows an example in which the guide post 3 is provided in the management target area AR. It is noted that the guide post 3 is not limited to one provided in the management target area AR. That is, the guide post 3 can be constructed in an environment which is connectable to the external network 8 as long as the guide post 3 can communicate with the virtual gateway 4. For example, the guide post 3 may use a server constructed on the network such as the Internet using cloud computing.

User terminals 6 each having a wireless communication function are provided in the management target area AR. The user terminal 6 is connectable to the external network 8 via the access point 8A using the wireless communication function.

FIG. 1 illustrates a case where one guide post 3, one virtual gateway (GW) 4, one device 5, and one user terminal 6 are provided as an example. The present disclosure is not limited thereto, and two or more of each may be provided.

(Guide Post 3)

Figure 2:
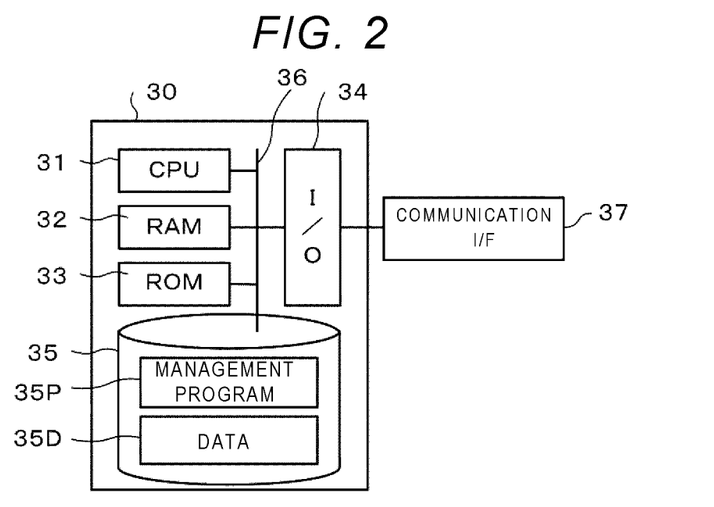
FIG. 2 is a diagram illustrating an example of a configuration of a guide post.

Next, an example of a configuration of the guide post 3 will be described with reference to FIG. 2. The guide post 3 is a server device that mainly exchanges information with the virtual gateway 4.

The guide post 3 includes a computer body 30. The computer body 30 includes a central processing unit (CPU) 31, a random access memory (RAM) 32, a read-only memory (ROM) 33, and an input and output port (I/O) 34 which are connected to one another via a bus 36. An auxiliary storage device 35 that may be implemented by a hard disk drive (HDD), a non-volatile flash memory, or the like is connected to the bus 36. A communication I/F 37 is connected to the I/O 34. The auxiliary storage device 35 stores various data 35D to be used by the guide post 3.

A management program 35P is stored in the auxiliary storage device 35. The CPU 31 executes a process by reading the management program 35P from the auxiliary storage device 35, and loading the management program 35P into the RAM 32. Accordingly, the guide post 3 that executes the management program 35P operates as a management device. The management program 35P may be provided from a recording medium such as a CD-ROM.

Virtual Gateway 4

Figure 3:
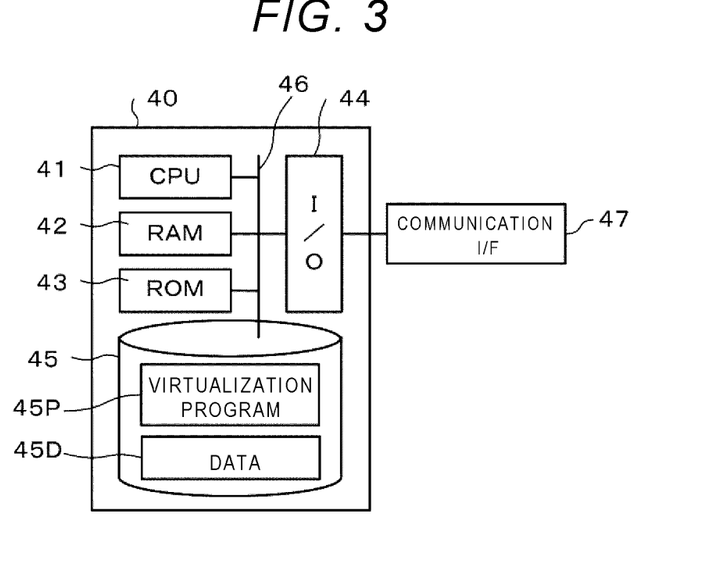
FIG. 3 is a diagram illustrating an example of a configuration of a virtual gateway.

Next, a configuration of the virtual gateway 4 will be described with reference to FIG. 3. The virtual gateway 4 is a server device that collectively controls exchanging of information by the user terminals 6 through the external network 8.

The virtual gateway 4 includes a computer body 40. The computer body 40 includes a CPU 41, a RAM 42, a ROM 43, and an I/O 44 which are connected to one another via a bus 46. An auxiliary storage device 45 that may be implemented by an HDD, a non-volatile flash memory, or the like is connected to the bus 46. A communication I/F 47 that communicates with an external device is connected to the I/O 44. The auxiliary storage device 45 stores various data 45D to be used by the virtual gateway 4.

The auxiliary storage device 45 may store a virtualization program 45P. The CPU 41 executes a process by reading the virtualization program 45P from the auxiliary storage device 45, and loading the virtualization program 45P into the RAM 42. Accordingly, the virtual gateway 4 that executes the virtualization program 45P operates as a virtual gateway.

The virtual gateway 4 may have a security function. An example of the security function is an intrusion prevention system (IPS) having a function of blocking an unauthorized packet when an unauthorized attack is detected from the outside and a function of preventing falsification of an access log. Another example of the security function is an intrusion detection system (IDS) that monitors network communication to detect (i) a sign of an unauthorized access or attack or (ii) a serious threat. Furthermore, other examples of the security function also include security functions such as antivirus and data loss prevention. The security functions such as IPS/IDS, antivirus, data leak prevention, and the like are known techniques, and detailed description thereof will be omitted.

Device 5

Figure 4:
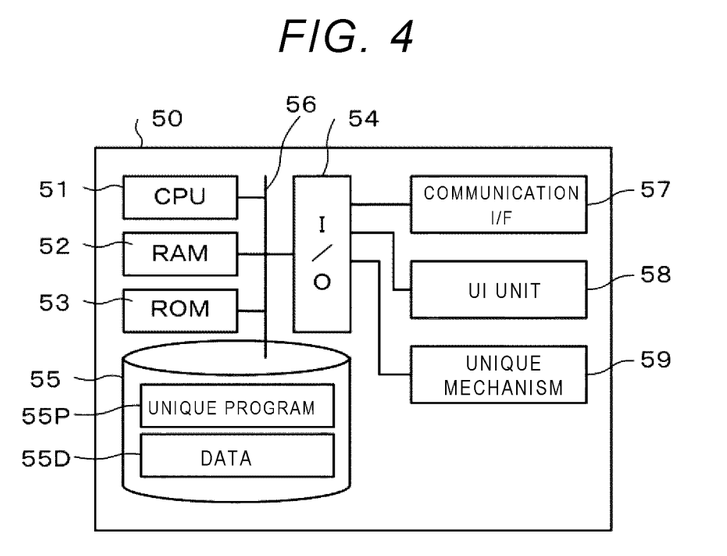
FIG. 4 is a diagram illustrating an example of a configuration of a device.

Next, an example of a configuration of the device 5 will be described with reference to FIG. 4. The device 5 is an electronic device such as a computer that executes various processes in the internal network 7.

The device 5 includes a computer body 50. The computer body 50 includes a CPU 51, a RAM 52, a ROM 53, and an input and output port (I/O) 54 which are connected to one another via a bus 56. An auxiliary storage device 55 is connected to the bus 56. A communication I/F 57, a UI unit 58 such as a touch panel capable of displaying an image, and a unique mechanism 59 are connected to the I/O 54.

An example of the unique mechanism is an image processing function. For example, examples of the image processing function includes (i) an image forming function including an image copying function of copying an original document and an image printing function of printing data of an input original document, and (ii) an image reading function of reading (scanning) the original document as an image to convert the image into data. Also, a scanner that scans an original document and a printer that prints various data are exemplified as the unique mechanism 59.

The auxiliary storage device 55 stores a unique program 55P that causes the device 5 to function as a unique device. The CPU 51 executes a process by reading the unique program 55P from the auxiliary storage device 55, and loading the unique program 55P into the RAM 52. Accordingly, the device 5 that executes the unique program 55P operates as the unique device. The auxiliary storage device 55 stores various data 55D to be used by the device 5.

The device 5 has a function of connecting the external network 8 such as the Internet under device management in the management target area AR (see FIG. 1). For example, the device 5 includes a network connection device (not shown) that controls connection between the internal network 7 and the external network 8, and is capable of performing data communication between the internal network 7 and the external network 8 via a network device (not shown). In this case, the device 5 may have a communication control function such as a known router and a known gateway that control data communication, and may also function as a default gateway in the management target area AR.

User Terminal 6

Figure 5:
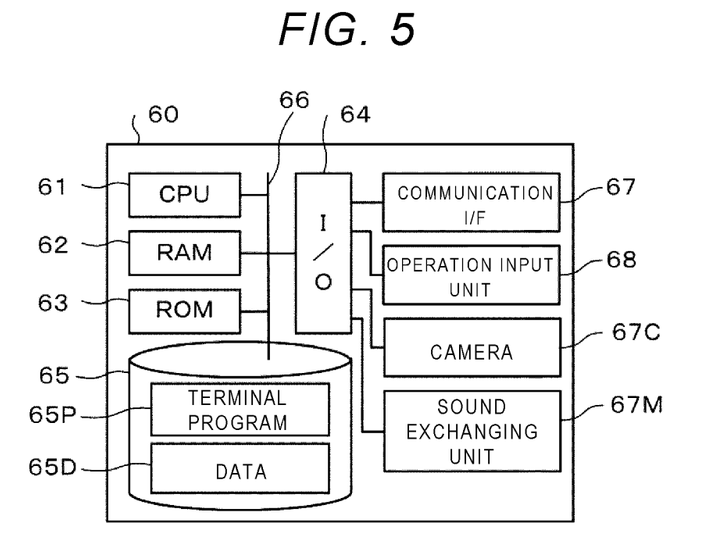
FIG. 5 is a diagram illustrating an example of a functional configuration of a user terminal.

Next, a configuration of the user terminal 6 will be described with reference to FIG. 5. An example of the user terminal 6 is a mobile terminal capable of being carried by a user.

The user terminal 6 includes a computer body 60. The computer body 60 includes a CPU 61, a RAM 62, a ROM 63, and an I/O 64, which are connected to one another via a bus 66. An auxiliary storage device 65 is connected to the bus 66. The I/O 64 is connected to a communication I/F 67 that communicates with an external device, and an operation input unit 68 for the user to check a display and input an operation. The I/O 64 is connected to a camera 67C that captures an image of a subject and a sound exchanging unit 67M that exchanges sounds with the user, such as a microphone and a speaker.

The auxiliary storage device 65 stores a terminal program 65P that causes the user terminal 6 to function as a terminal. The CPU 61 executes a process by reading the terminal program 65P from the auxiliary storage device 65, and loading the terminal program 65P into the RAM 62. Accordingly, the user terminal 6 that executes the terminal program 65P operates as the terminal. The auxiliary storage device 65 stores various data 65D to be used by the user terminal 6.

In the present exemplary embodiment, a case where the user terminal 6 is a terminal such as an in-house mobile phone that simply accesses the internal network 7 by wireless communication will be described. That is, the user terminal 6 is a terminal capable of performing a virtual private network (VPN) connection to the internal network 7 based on previously stored information about VPN. Therefore, the data 65D stores an IP address for accessing the internal network 7 in the management target area AR. When transmitting data, the user terminal 6, serving as a transmission source, transmits data including the IP address.

Each of the guide post 3, the virtual gateway 4, and the device 5 also includes the IP address for accessing the internal network 7 in the management target area AR. When transmitting data, the guide post 3, the virtual gateway 4, and the device 5, each serving as a transmission source, transmit data including the IP address.

The guide post 3 and the virtual gateway 4 have a function of a VPN connection, that is, a function of establishing a virtual tunnel between (i) the user terminal 6 connecting to the external network 8 and (ii) the guide post 3 and establishing a virtual tunnel between (i) the user terminal 6 connecting to the external network 8 and (ii) the virtual gateway 4, so establish a private network for connection.

The user terminal 6 is an example of a communication terminal of the present disclosure. The virtual gateway 4 is an example of a specific connection unit of the present disclosure. The guide post 3 and the virtual gateway 4 are examples of the communication control device of the present disclosure. The identification information and the IP address of the user terminal 6 are examples of the identification information of the present disclosure. The IP address of the virtual gateway 4 is an example of specific connection unit information of the present disclosure. Information in which the identification information of the user terminal 6 and the IP address of the virtual gateway 4 are associated is an example of an information set of the present disclosure.

Operation of Network System 1

Next, an operation of the network system 1 according to the present exemplary embodiment will be described with reference to FIG. 6.

Figure 6:
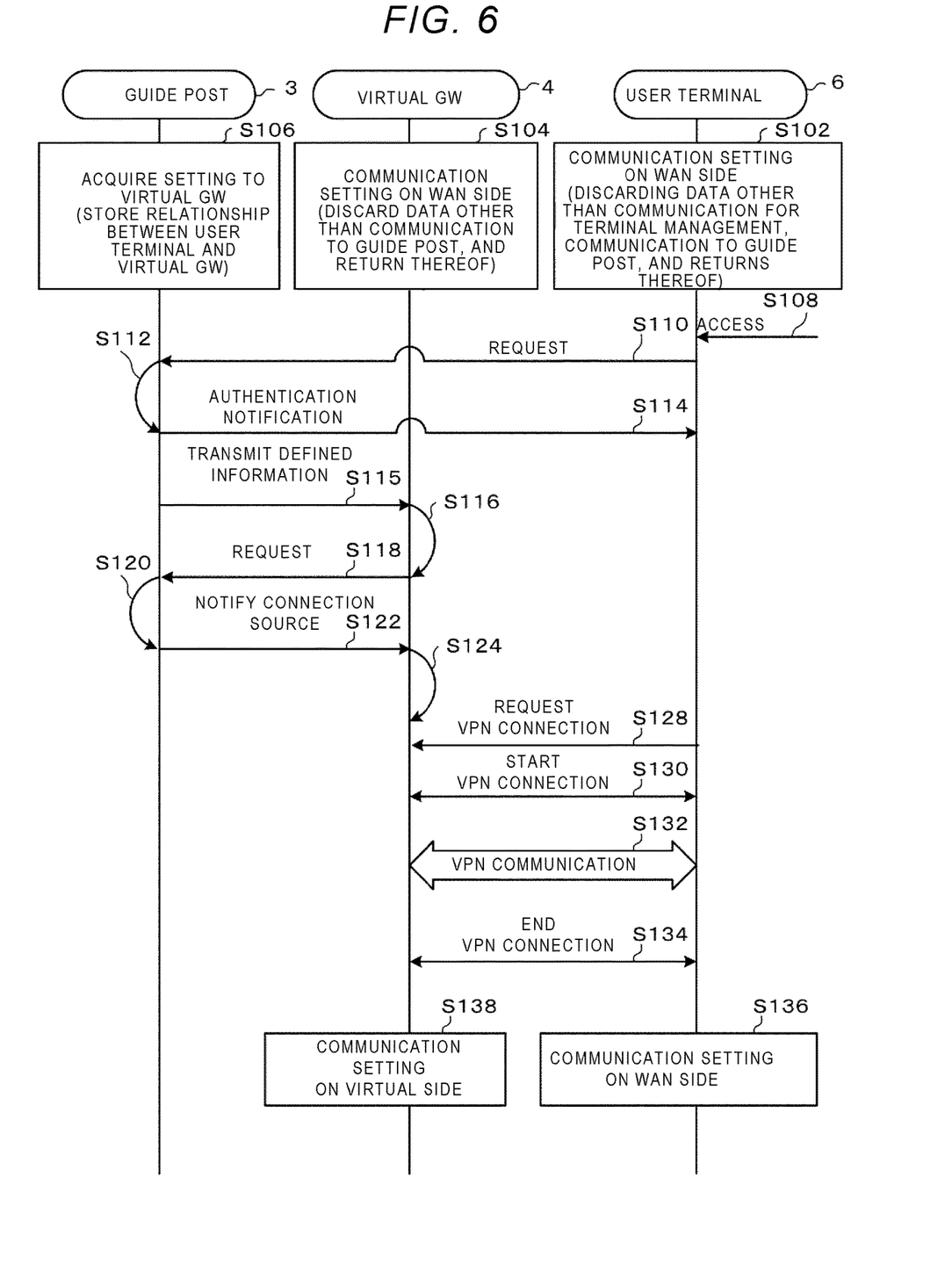
FIG. 6 is a diagram illustrating an example of a process flow in an internal network in response to an access in an internal network.

FIG. 6 is a diagram illustrating an example of a process flow in the internal network 7 in response to an access from the user terminal 6, and illustrates a flow of data exchange among the user terminal 6, the guide post 3, and the virtual gateway 4.

As shown in FIG. 6, in response to the access from the user terminal 6, the user terminal 6, the guide post 3, and the virtual gateway 4 executes respective processes by the CPUs executing the processes shown in FIG. 6.

First, in each of the user terminal 6, the virtual gateway 4, and the guide post 3, initial setting (steps S102, S104, S106) is executed.

Specifically, the user terminal 6 performs a communication setting process on an external network 8 side (denoted as a WAN side in FIG. 6) as the initial setting (step S102). The communication setting process of the user terminal 6 is a process of making a setting as a communication setting on the WAN side such that all data received from the external network 8 are discarded in cases other than (i) a case in which a transmission destination in communication is a guide post 3, (ii) a case of communication necessary for terminal management, and (iii) a case of a return thereof.

The virtual gateway 4 performs a communication setting process of the virtual gateway 4 as the initial setting (step S104). The communication setting process of the virtual gateway 4 is a process of making a setting as a communication setting on the WAN side such that discarded are all packets of data transmitted to and received from the virtual gateway 4 other than (i) packets in communication to the guide post 3 and (ii) return packets thereof.

In the guide post 3, an acquisition process of setting values related to communication with the user terminal 6 and the virtual gateway 4 is performed as the initial setting (step S106). The acquisition process of the setting values in the guide post 3 includes a process of acquiring setting data indicating which virtual gateway 4 is set as a connection destination of the data transmitted to the guide post 3. That is, information indicating a relationship between the user terminal 6 and the virtual gateway 4 is stored in a table of the guide post 3, and the information is acquired. Specifically, the process is a process of previously storing the table in which a correspondence relationship between an identifier of the user terminal 6 and the IP address of the virtual gateway 4 is registered in advance, and acquiring the data indicating the stored table. The IP address may be data unique to the internal network 7. The guide post 3 also stores information including an identifier and authentication information of the user terminal 6 for authenticating the user terminal 6, and acquires the information as well.

When an access process of the user terminal 6 is started (step S108), first, the user terminal 6 accesses the guide post 3 via the external network 8 and makes a query indicating a VPN connection request (step S110). The user terminal 6 transmits, as the query, the information including the identifier and the authentication information. Then, the guide post 3 receives the information including the identifier and the authentication information of the user terminal 6 because of the access from the user terminal 6.

The guide post 3 receives the query from the user terminal 6, and first performs an authentication process (step S112). Examples of the authentication process includes authentication methods such as an ID password method, a secret hash method, and a signature verification method using a public key. The authentication process is a process of determining whether the IP address of the user terminal 6 is registered in the table acquired in step S106. For example, in the ID password method, an ID and a password of each user terminal 6 may be stored as the identifier and the authentication information, and it may be determined whether the ID and the password stored in the acquired information are included.

Next, the guide post 3 transmits an authentication notification indicating a result of the authentication process to the user terminal 6 (step S114). Specifically, the guide post 3 performs an authentication using the identifier and the authentication information of the user terminal 6. When the authentication is successful, the guide post 3 stores the IP address of the user terminal 6 and transmits data indicating a completion of the authentication as the authentication notification to the user terminal 6. The authentication notification includes information indicating the IP address of the virtual gateway 4 which is the VPN connection destination. On the other hand, when the authentication fails, data indicating authentication failure is transmitted as the authentication notification to the user terminal 6.

Next, the guide post 3 transmits specified information to the virtual gateway 4 (step S115). The specified information is information indicating that the VPN connection request is made from the user terminal 6 to the virtual gateway 4.

When the virtual gateway 4 detects reception of the specified information from the guide post 3, the virtual gateway 4 performs an access detection process (step S116). In the access detection process, while packets from the guide post 3 are discarded according to the communication setting in step S104, a record of the discarding is monitored so as to detect the access from the guide post 3.

Next, the virtual gateway 4 performs a query process to the guide post 3 as a response to the detection of the access from the guide post 3 (step S118). Specifically, the virtual gateway 4 transmits, as the query process, data requesting to return the IP address of the user terminal 6 whose connection is permitted.

The guide post 3 receives the query from the virtual gateway 4 (step S120) and performs a connection source notification process (step S122). The connection source notification process is a process of transmitting the IP address of the user terminal 6 that is authenticated and notified of the data indicating the completion of the authentication in step S114.

The virtual gateway 4 receives a connection source notification from the guide post 3 and performs a VPN connection standby process (step S124). The VPN connection standby process is a process of waiting for the VPN connection request from the user terminal 6 which is the connection source accepted in step S122.

When the user terminal 6 receives the authentication notification (S114) transmitted from the guide post 3, the user terminal 6 performs a VPN connection process. Specifically, the user terminal 6 uses the IP address included in the authentication notification from the guide post 3 to transmit data indicating the VPN connection request to the virtual gateway 4 having the IP address as the VPN connection destination (step S128).

The virtual gateway 4 receives the VPN connection request from the user terminal 6, and starts the VPN connection, and the user terminal 6 also starts the VPN connection (step S130). Accordingly, a VPN environment (a VPN environment 6VPN shown in FIG. 1) is constructed between the virtual gateway 4 and the user terminal 6. Then, VPN communication is performed between the virtual gateway 4 and the user terminal 6 in the constructed VPN environment (step S132).

Thus, it is possible to treat the user terminal 6 as a terminal belonging to a virtual LAN, which is connected to the external network 8 via the virtual gateway 4. Connection destinations of the user terminals 6 are aggregated in the virtual gateway 4 in the management target area AR. Therefore, the user terminals 6 whose connection destinations are aggregated in the virtual gateway 4 can be managed by the virtual gateway 4.

When the VPN connection is blocked, or when the VPN connection is terminated by at least one of the virtual gateway 4 or the user terminal 6 (step S134), the VPN communication is ended.

When the VPN connection is ended, the user terminal 6 performs the same communication setting process as the initial setting (step S102) (step S136), and the virtual gateway 4 also performs the same communication setting process as the initial setting (step S104) (step S138).

As described above, according to the present exemplary embodiment, the user terminal 6 connectable to the external network 8 can be managed by the virtual gateway 4 as compared with a case where the user terminal 6 connectable to the external network 8 is freely connected to the external network 8 for use.

According to the present exemplary embodiment, the connections of the user terminals 6 via the external network 8 are aggregated in the virtual gateway 4, and the virtual gateway 4 enables the user terminals 6 to connect to the internal network 7. Therefore, even in a case the user terminal 6 is connected via the external network 8, that is, a case where the user terminal 6 is not directly connected to the internal network 7, the user terminal 6 can be treated as a manageable user terminal. In a case where the virtual gateway 4 has the security function, the same security function as that of the device connected to the internal network 7 can be applied to even the user terminal 6 that is connected via the external network 8.

Figure 7:
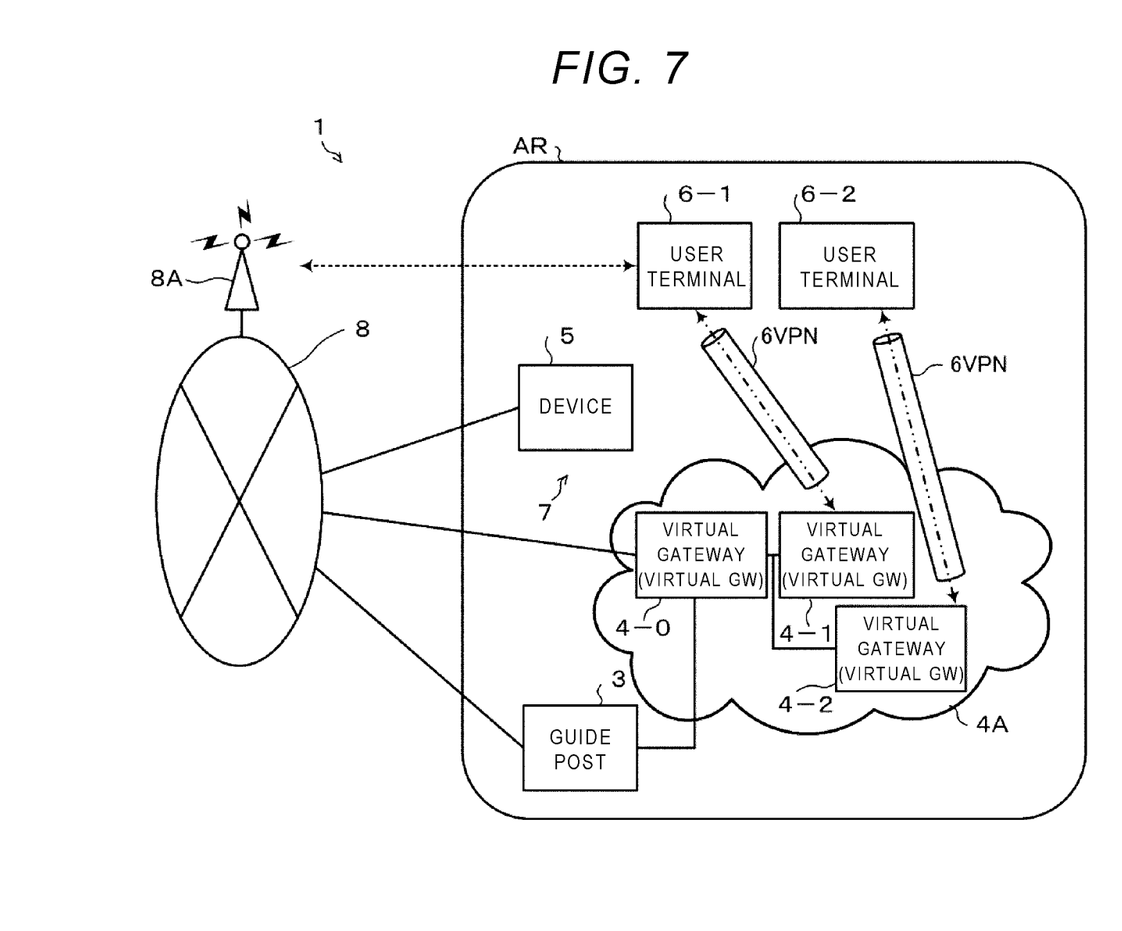
FIG. 7 is a diagram illustrating an example of a virtual gateway having a hierarchical structure.

The present exemplary embodiment is easily applied to a case where plural virtual gateways 4 are provided. For example, the virtual gateway 4 may have a hierarchical structure as shown in FIG. 7 in order to ensure an upper limit of the number of connections or facilitate management. In an example shown in FIG. 7, the virtual gateway 4 is constructed in a hierarchical structure having virtual gateways 4-0, 4-1, and 4-2. Among the user terminals 6, a user terminal 6-1 is connected to the virtual gateway 4-1 and a user terminal 6-2 is connected to the virtual gateway 4-2. The hierarchized virtual gateway 4 can manage and control the connected user terminals 6 in unit of companies or departments.

The present exemplary embodiment is described without limiting a form of the IP address. Address exhaustion is easily prevented by properly using a so-called IPv4 address and a so-called IPv6 address. For example, the virtual gateway 4 has a so-called IPv4 address, has an IPv6 address on an internal network 7 side, and performs communication in accordance with an IPv4 protocol in the VPN connection (inside the tunnel), thereby making it possible to save global IPv4 allocation.

The example in which the user terminal 6 has the wireless communication function is described in the present exemplary embodiment. The user terminal 6 is not limited to the terminal having a wireless function. For example, the wireless function may be provided by connecting a dedicated wireless device to the user terminal. The user terminal 6 is not limited to one having a wireless function. For example, the user terminal 6 may be a terminal connectable to the internal network 7 via the external network 8 by a wired connection.

Second Exemplary Embodiment

Next, a second exemplary embodiment will be described. In the first exemplary embodiment, the case where the device 5 connectable to the external network 8 is provided is described. Alternatively, the device 5 may be connected to the external network 8 via a connection device.

Figure 8:
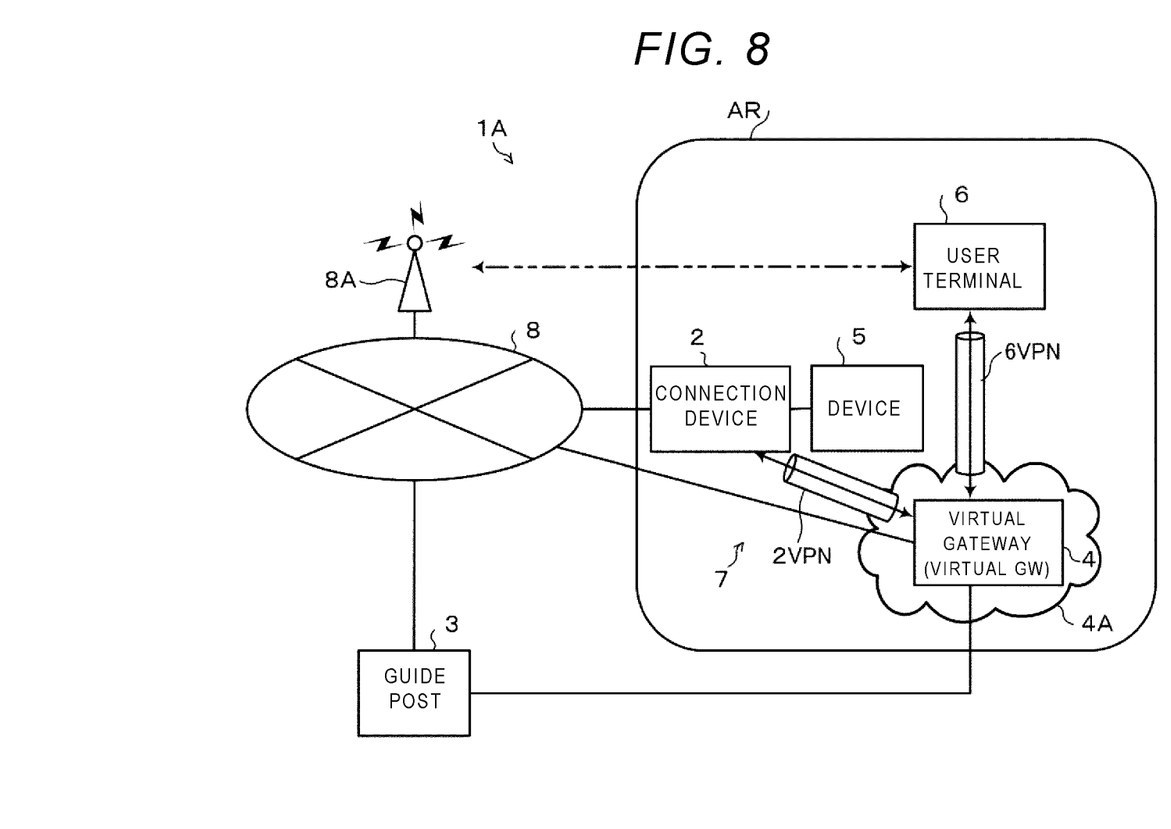
FIG. 8 is a diagram illustrating a schematic configuration of a network system according to another exemplary embodiment.

FIG. 8 is a diagram illustrating a schematic configuration of a network system according to the second exemplary embodiment.

As shown in FIG. 8, in a network system 1A, the device 5 is connected to the external network 8 via a connection device 2. The VPN environment (a VPN environment 2VPN) is previously constructed between the virtual gateway 4 and the connection device 2, and the virtual gateway 4 is configured to be connectable to the connection device 2. In FIG. 8, a case where the guide post 3 is provided outside the management target area AR is shown as an example.

Functions as Default Gateway

The connection device 2 mainly functions as a network connection device that controls the connection between the internal network 7 and the external network 8. The connection device 2 has a communication control function of controlling data communication. The connection device 2 functions as a default gateway in the management target area AR. Examples of the communication control function include a function of limiting (for example, blocking) the data communication between the internal network 7 and the external network 8. By limiting the data communication in the connection device 2, it is possible to limit (for example, block) the communication between the internal network 7 including the device 5 and the external network 8.

In the network system 1A, a connection from the user terminal 6 to the device 5 via the connection device 2 is possible.

As described above, the connections of the user terminals 6 via the external network 8 can aggregated in the virtual gateway 4, and the user terminals 6 can also be connected to the internal network 7. Therefore, even in a case where the user terminal 6 is connected via the external network 8, that is, a case where the user terminal 6 is not directly connected to the internal network 7, the user terminal 6 can be treated as the user terminal connected to the internal network 7. In a case where the internal network 7 has a security function, even though the user terminal 6 is connected via the external network 8, the security function provided in the internal network 7 can be applied to the user terminal 6.

Other Exemplary Embodiments

The techniques of the present disclosure are described above in detail using specific exemplary embodiments. It is noted that the techniques of the present disclosure are not limited to the exemplary embodiments. Various other exemplary embodiments may be made within the scope of the techniques of the present disclosure.

In the above exemplary embodiments, the processes performed by executing the programs stored in the auxiliary storage devices are described. Alternatively, the processes of the programs may be implemented by hardware.

The processes in the above exemplary embodiments may be stored as programs in a storage medium such as an optical disc and distributed.

In the exemplary embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A communication control device comprising:
a processor configured to:
acquire identification information of a communication terminal from the communication terminal by communication via a wide area communication network, and authenticate the communication terminal based on the identification information;
upon successful authentication of the communication terminal, obtain, from a storage storing an information set in which associated are (i) the identification information of the communication terminal and (ii) specific connection unit information indicating a specific connection unit that is predetermined for the communication terminal in a narrow area communication network different from the wide area communication network, the specific connection unit information;
transmit the specific connection unit information to the communication terminal, wherein the communication terminal does not have the specific connection unit information until it is transmitted by the communication control device;
transmit specified information to the specific connection unit, the specified information indicating a request for communication via the narrow area communication network from the communication terminal, wherein the specific connection unit is in a state in which all data is discarded other than communication from itself to the communication control device and return communication thereof; and
perform control such that the communication terminal is connected to the specific connection unit as a connection destination of the communication terminal, based on the specific connection unit information.

2. The communication control device according to claim 1, wherein the specific connection unit is a virtual connection unit in which at least a part of a connection device that connects the communication terminal to the narrow area communication network is virtualized.

3. The communication control device according to claim 2, wherein
the narrow area communication network is constructed in a hierarchical structure, and
the specific connection unit is constructed for each layer of the hierarchical structure.

4. The communication control device according to claim 1, wherein the processor is configured to perform control such that the communication terminal and the specific connection unit are connected by a secret line.

5. The communication control device according to claim 2, wherein the processor is configured to perform control such that the communication terminal and the specific connection unit are connected by a secret line.

6. The communication control device according to claim 3, wherein the processor is configured to perform control such that the communication terminal and the specific connection unit are connected by a secret line.

7. The communication control device according to claim 1, wherein the communication terminal is a terminal capable of performing wireless communication with the wide area communication network.

8. The communication control device according to claim 2, wherein the communication terminal is a terminal capable of performing wireless communication with the wide area communication network.

9. The communication control device according to claim 3, wherein the communication terminal is a terminal capable of performing wireless communication with the wide area communication network.

10. The communication control device according to claim 4, wherein the communication terminal is a terminal capable of performing wireless communication with the wide area communication network.

11. The communication control device according to claim 5, wherein the communication terminal is a terminal capable of performing wireless communication with the wide area communication network.

12. The communication control device according to claim 6, wherein the communication terminal is a terminal capable of performing wireless communication with the wide area communication network.

13. The communication control device according to claim 1, wherein the communication terminal is a terminal capable of performing wired communication with the wide area communication network.

14. The communication control device according to claim 2, wherein the communication terminal is a terminal capable of performing wired communication with the wide area communication network.

15. The communication control device according to claim 3, wherein the communication terminal is a terminal capable of performing wired communication with the wide area communication network.

16. The communication control device according to claim 4, wherein the communication terminal is a terminal capable of performing wired communication with the wide area communication network.

17. The communication control device according to claim 5, wherein the communication terminal is a terminal capable of performing wired communication with the wide area communication network.

18. The communication control device according to claim 6, wherein the communication terminal is a terminal capable of performing wired communication with the wide area communication network.

19. A non-transitory computer readable medium storing a program that causes a processor to perform communication control processing, the communication control processing comprising:
acquiring identification information of a communication terminal from the communication terminal by communication via a wide area communication network, and authenticating the communication terminal based on the identification information;
upon successful authentication of the communication terminal, obtaining, from a storage storing an information set in which associated are (i) the identification information of the communication terminal and (ii) specific connection unit information indicating a specific connection unit that is predetermined for the communication terminal in a narrow area communication network different from the wide area communication network, the specific connection unit information;
transmitting the specific connection unit information to the communication terminal, wherein the communication terminal does not have the specific connection unit information until it is transmitted by the communication control device;

transmitting specified information to the specific connection unit, the specified information indicating a request for communication via the narrow area communication network from the communication terminal, wherein the specific connection unit is in a state in which all data is discarded other than communication from itself to the communication control device and return communication thereof; and performing control such that the communication terminal is connected to the specific connection unit as a connection destination of the communication terminal, based on the specific connection unit information.

20. A method of communication control to be performed by a communication control device, the method comprising:

acquiring identification information of a communication terminal from the communication terminal by communication via a wide area communication network, and authenticating the communication terminal based on the identification information;

upon successful authentication of the communication terminal, obtaining, from a storage storing an information set in which associated are (i) the identification information of the communication terminal and (ii) specific connection unit information indicating a specific connection unit that is predetermined for the communication terminal in a narrow area communication network different from the wide area communication network, the specific connection unit information;

transmitting the specific connection unit information to the communication terminal, wherein the communication terminal does not have the specific connection unit information until it is transmitted by the communication control device;

transmitting specified information to the specific connection unit, the specified information indicating a request for communication via the narrow area communication network from the communication terminal, wherein the specific connection unit is in a state in which all data is discarded other than communication from itself to the communication control device and return communication thereof; and performing control such that the communication terminal is connected to the specific connection unit as a connection destination of the communication terminal, based on the specific connection unit information.

* * * * *